United States Patent [19]

Kidd

[11] Patent Number: 4,721,696

[45] Date of Patent: Jan. 26, 1988

[54] SILICA-MODIFIED ALUMINA AND PROCESS FOR ITS PREPARATION

[75] Inventor: Dennis R. Kidd, Bartlesville, Okla.

[73] Assignee: Phillips Petroleum Company, Bartlesville, Okla.

[21] Appl. No.: 24,506

[22] Filed: Mar. 11, 1987

[51] Int. Cl.$^4$ .......................... B01J 21/04; B01J 21/08
[52] U.S. Cl. .................................... 502/210; 502/208; 502/209; 502/211; 502/213; 502/214; 502/216; 502/218; 502/219; 502/220; 502/222; 502/241; 502/242; 502/243; 502/244; 502/246; 502/247; 502/254; 502/255; 502/258; 502/259; 502/260; 502/263
[58] Field of Search ............... 502/241, 242, 243, 244, 502/246, 247, 254, 255, 258, 259, 260, 263, 208, 209, 210, 211, 213, 214, 216, 218, 219, 220, 222

[56] References Cited

U.S. PATENT DOCUMENTS

| | | | |
|---|---|---|---|
| 3,193,511 | 8/1965 | Cramer et al. | 252/453 |
| 3,274,124 | 9/1966 | O'Hara | 252/451 |
| 3,346,509 | 10/1967 | Stewart | 252/453 |
| 3,905,916 | 9/1975 | Riley et al. | 502/255 X |
| 3,923,692 | 12/1975 | Braithwaite et al. | 252/455 R |
| 3,925,253 | 12/1975 | Stephens | 252/455 R |
| 4,134,856 | 1/1979 | Itoh et al. | 502/242 X |
| 4,154,812 | 5/1979 | Sanchez et al. | 423/626 |

OTHER PUBLICATIONS

"Control of the Pore Structure of Porous Alumina" by T. Ono, Y. Ohguchi and O. Togari; 1983, published in Preparation of Catalysts III, Elsivier Science Publishers, pp. 631–641.

*Primary Examiner*—W. J. Shine
*Attorney, Agent, or Firm*—K. K. Brandes

[57] ABSTRACT

A composition of matter comprising alumina as the major component and silica as a minor component is prepared by a process comprising sequential addition of solutions of aluminum salt and alkali metal aluminate, addition of a solution of alkali metal silicate to dispersed alumina hydrogen and heating formed alumina-silica hydrogel under dehydrating conditions. The thus prepared composition of matter, optionally promoted with at least one transition metal compound, can be used as a catalyst for hydrotreating substantially liquid hydrocarbon-containing feed streams which also contain sulfur and metal compounds as impurities.

39 Claims, No Drawings

SILICA-MODIFIED ALUMINA AND PROCESS FOR ITS PREPARATION

BACKGROUND OF THE INVENTION

In one aspect, this invention relates to a process for preparing compositions of matter which contain alumina as the major component and silica as a minor component. In another aspect, this invention relates to compositions that contain alumina as the major component and silica as a minor component, said compositions possessing high surface area and high pore volume. In a further aspect, this invention relates to compositions that contain alumina as the major component, silica as a minor component and, additionally, hydrotreating promoter(s). In still another aspect, this invention relates to a process for hydrotreating liquid hydrocarbon-containing feed streams, which contain sulfur and metal impurities, in the presence of a catalyst composition comprising alumina as the major component and silica as a minor component.

Numerous processes for making alumina-silica compositions, suitable as catalysts or catalyst supports, are known. Some of these processes, such as those disclosed in U.S. Pat. Nos. 3,925,253 and 3,923,692, produce silica-coated alumina materials suitable as hydrotreating support materials for catalysts. However, there is an ever present need to develop new silica-modified alumina materials having a desirably high surface area and high pore volume, suitable for use in heavy oil hydrotreating processes.

SUMMARY OF THE INVENTION

It is an object of this invention to provide a process for preparing compositions comprising alumina as the major component (i.e., being present at a percentage of above about 50 weight percent) and silica as a minor, modifying component (i.e., present at less than about 50 weight percent). It is another object of this invention, to provide a composition having high surface area and high pore volume comprising alumina as the major component and silica as a minor, modifying component. It is a further object of this invention to provide a transition metal-promoted composition, suitable as hydrotreating composition, comprising alumina as the major component and silica as a minor, modifying component. It is still another object of this invention to provide a process for hydrotreating a liquid hydrocarbon-containing feed stream, which also contains sulfur and metal impurities, in the presence of a transition metal-promoted catalyst composition of high surface area and high pore volume comprising alumina as the major component and silica as a minor, modifying component. Other objects and advantages will be apparent from the detailed description and the appended claims.

In accordance with this invention, there is provided a process for preparing a composition of matter comprising alumina as the major component and silica as a minor component, said process comprising the steps of (a) mixing a first solution comprising (preferably consisting essentially of) water and at least one dissolved aluminum salt (i.e., one or two or more water-soluble compounds wherein the cation contains aluminum) with a suitable amount of a second solution comprising (preferably consisting essentially of) water and at least one dissolved alkali metal aluminate (i.e., one or two or more compounds wherein the anion contains aluminum and oxygen and the cation contains alkali metal), under such conditions as to obtain a dispersion of precipitated alumina hydrogel in an aqueous solution having a pH of about 8 to about 10;

(b) adding a suitable amount of said first solution to said dispersion of precipitated alumina hydrogel in an aqueous solution having a pH of about 8 to about 10 obtained in step (a), so as to obtain a dispersion of precipitated alumina hydrogel in an aqueous solution having a pH of about 2 to about 4;

(c) adding a suitable amount of said second solution to said dispersion of precipitated alumina hydrogel in the aqueous solution having a pH of about 2 to about 4 obtained in step (b), so as to obtain a dispersion of precipitated alumina hydrogel in an aqueous solution having a pH of about 8 to about 10;

(d) repeating steps (b) and (c) at least once (preferably 2 to 10 times, more preferably 3 to 8 times);

(e) adding a third solution comprising (preferably consisting essentially of) water and at least one dissolved alkali metal silicate (preferably orthosilicate) to the dispersion of precipitated alumina hydrogel in an aqueous solution having a pH of about 8 to about 10 obtained at the end of step (d), under such conditions and at such proportion as to obtain a dispersion of alumina-silica hydrogel in an aqueous solution;

(f) separating said alumina-silica hydrogel from the aqueous solution in which said hydrogel is dispersed;

(g) heating (calcining) the separated alumina-silica hydrogel obtained in step (f) under such conditions as to substantially dehydrate it and to obtain a composition of matter comprising (preferably consisting essentially of) alumina as the major component and silica as a minor component (preferably about 1–30 weight-% $SiO_2$).

In a preferred embodiment, the aluminum salt in said first solution is aluminum nitrate, the alkali metal aluminate in said second solution is sodium aluminate, and the alkali metal silicate in said third solution is sodium orthosilicate. In another preferred embodiment, the preparation process of this invention comprises the additional steps of (e1) adding a sufficient amount of said first solution to said dispersion of alumina-silica hydrogel dispersed in an aqueous solution obtained at the end of step (e), so as to attain a pH of about 7–8, and (f1) washing the separated alumina-silica hydrogel obtained in step (f) with water (or with an aqueous solution, e.g., one containing ammonia or an ammonium salt such as $NH_4NO_3$). When step (f1) is employed, step (g) is carried out with the washed alumina-silica hydrogel obtained in step (f1).

In a further embodiment, step (g) is carried out in two sub-steps:

(g1) heating the separated alumina-silica hydrogel from step (f) or, alternatively, step (f1), at a first temperature so as to substantially dry said alumina-silica hydrogel (preferably so as to reduce the water content in the hydrogel to less than 30 weight-% $H_2O$), and (g2) heating the substantially dried material obtained in step (g1) at a second temperature (more preferably at about 900°–1900° F.), which is higher than said first temperature, so as to produce the composition of this invention comprising alumina and silica (in substantially dehydrated form (i.e., at no more than about 1 weight-% $H_2O$).

A preferred embodiment of the preparation process of this invention, as described above, comprises the additional steps of:

(h) impregnating the composition comprising alumina and silica obtained in step (g) or, alternatively (g2), with a solution (preferably aqueous) containing at least one compound of at least one transistion metal selected from metals belonging to Groups IIIB, IVB, VB, VIB, VIIB, VIII and IB of the Periodic Table (as defined by Webster's New Collegiate Dictionary, 1977, page 852), and (i) heating the thus impregnated material obtained in step (h) under such conditions as to substantially dry it and to at least partially convert said at least one compound of at least one transistion metal to at least one transition metal oxide. More preferably, heating step (i) is carried out in two sub-steps:

(i1) heating the impregnated material obtained in step (h) at a first temperature so as to substantially dry the material obtained in step (h), and (i2) heating the substantially dried material obtained in step (i1) at a second temperature, which is higher than said first temperature, under such conditions as to convert at least a portion of said at least one compound of at least one transistion metal to at least one transition metal oxide.

Also in accordance with this invention, there is provided a composition of matter comprising (consisting essentially of) alumina as the major component and silica as a minor component, prepared by the process comprising steps (a) through (g), preferably steps (a), (b), (c), (d), (e1), (f1), (g1), and (g2). In another embodiment, there is provided a composition of matter comprising alumina as a major component, silica as a minor component and at least one compound of at least one transition metal (also as minor component), prepared by the steps (a) through (i), preferably steps (a), (b), (c), (d), (e1), (f1), (g1), (g2), (h), (i1) and (i2).

Further in accordance with this invention, a hydrotreating process is provided comprising the steps of contacting (A) a substantially liquid (i.e., substantially liquid at the hydrotreating conditions) hydrocarbon-containing feed stream, which also contains compounds of sulfur and metals (preferably at least one of Ni and V), with (B) a free hydrogen-containing gas and (C) a catalyst composition having been prepared by the process comprising the steps of (a) through (g) [preferably (a), (b), (c), (d), (e1), (f1), (g1) and (g2)] or, alternatively, (a) through (i) [preferably (a), (b), (c), (d), (e1), (f1), (g1), (g2), (h), (i1) and (i2)], under such hydrotreating conditions as to obtain a hydrocarbon-containing product stream containing reduced (i.e., lower) levels of sulfur and metals.

DETAILED DESCRIPTION OF THE INVENTION

The term "alumina hydrogel" as used herein is defined as a coagulated colloid of precipitated, hydrated alumina and/or aluminum hydroxide containing an embedded aqueous phase. The term "alumina-silica hydrogel" as used herein is defined as a coagulated colloid of alumina and/or aluminum hydroxide as a major component and hydrated silica as a minor component, said coagulated colloid containing an embedded aqueous phase. The term "dispersion" as used herein is defined as a system wherein particles, especially colloidal hydrogel particles, are dispersed or suspended in a liquid phase.

Suitable aluminum salts which can be used as solvents in the first aqueous solution employed in steps (a), (b), (d), and optionally (e1) are those that are substantially water-soluble, such as $Al(NO_3)_3$, $Al_2(SO_4)_3$, $KAl(SO_4)_2$, $NH_4Al(SO_4)_2$, aluminum acetate and the like, and hydrates thereof, preferably aluminum nitrate, more preferably a hydrate of $Al(NO_3)_3$.

Suitable alkali metal aluminates (preferably sodium aluminate) which can be used as solutes in the second aqueous solution employed in steps (a), (c) and (d) are those that are substantially water-soluble, such as $M[Al(OH)_4]$, $M_3[Al(OH)_6]$, $M_2[Al(OH)_3-O-Al(OH)_3]$, $M_3[Al(OH)_3-O-Al(OH)_3-O-Al(OH)_3]$, $M_4[M(OH)_3-O-Al(OH)_3-O-Al(OH)_3]$, $M[H_2AlO_3]=M_2O.Al_2O_3.2H_2O$, $M_2[H_2Al_2O_5]=M_2O.Al_2O_3.H_2O$ and the like, wherein M is selected from the group consisting of Li, Na, K, Rb and Cs, preferably Na. Generally, the second solution is prepared by dissolving a precipitate of alumina hydrogel in an aqueous solution of alkali metal hydroxide.

Suitable alkali metal silicates which can be used as solutes in the third solution employed in step (e) are those that are substantially water-soluble, such as $M_2SiO_3$, $M_2Si_2O_5$, $M_4SiO_4$, $M(Si_2O_7)_6$, $M(Si_3O_9)_6$, $M(Si_6O_{18})_{12}$ and the like (including hydrated form thereof), wherein M is defined as above. Preferably, the alkali metal silicate is sodium silicate, more preferably sodium orthosilicate ($Na_4SiO_4$).

Any suitable concentration of the above-described solutes can be used in the first, second and third solutions. Generally, the concentration of Al salt in the first solution is in the range of from about 0.5 to about 3.5 mol/l (mol solute per liter solution), preferably from about 1.0 to about 2.5 mol/l, and more preferably from about 1.3 to about 2.0 mol/l. Generally, the concentration of the alkali metal aluminate in the second solution is in the range of from about 3.0 to about 8.0 mol/l, preferably from about 5.5 to about 7.5, mol/l, more preferably from about 6.0 to about 7.3 mol/l. Generally, the concentration of the alkali metal silicate in the third solution is in the range of from about 0.5 to about 7.0 mol/l, preferably from about 1.0 to about 5.0 mole/l and more preferably from about 1.7 mol/l to about 3.5 mol/l.

Any suitable weight ratio of the first and second solutions can be applied in step (a). The specific amounts of solutions added in steps (a) through (e) greatly depend on the concentrations of these added solutions and also on the amounts and concentrations of the solutions (with or without dispersed hydrogel) to which said former solutions are added.

In step (a), the first solution can be added to the second solution, as the second solution can be added to the first solution (preferred mode), or both solutions can be added simultaneously to a suitable vessel. Any suitable time of addition of first and/or second solutions can be employed. The time of addition depends to a great extent on parameters such as concentration of solution, volume of medium to which a solution is added, temperature of solution and of said medium, extent of agitation during addition, size of mixing vessel and the like. Generally, the rate of addition is in the range of from about 0.5 to about 50 minutes, preferably about 1 to about 15 minutes.

Any suitable time of addition of the respective solution in steps (b), (c), (d) and (e) and, optionally, (e1) can be employed. The time of addition depends to a great extent on parameters such as concentration of solution, volume of medium to which a solution is added, temperature of solution and of said medium, extent of agitation during addition, size of vessel containing said medium, and the like. Generally, the rate of addition is in the range of from about 0.5 to about 60 cc/minutes and preferably from about 3.0 to about 15.0 cc/minutes.

Any suitable type and rate of agitation in each of the steps (a), (b) (c), (d), (e), and optional step (e1) can be employed. Generally, a mechanical stirrer is employed which can rotate at a rate in the range of from about 5 to about 200 revolutions/minute.

Any suitable temperature during each of the steps (a), (b), (c), (d) (e) and optional step (e1) can be employed. Generally, the temperature in each of the above-cited steps in in the range of from about 30° to about 95° C., preferably from about 40° to about 90° C., and more preferably from about 55° to about 80° C.

Any suitable period of time between the successive steps can be employed. Generally, there is a time lag between the completion of an addition (mixing) step and the commencement of another addition step, (e.g., between steps (a) and (b), (b) and (c), (c) and (d), and (d) and (e), etc.) can range of from about 1 to about 15 minutes, preferably from about 2 to about 5 minutes. Generally, the agitation (as described above) was carried out during such period of time between the successive addition steps. Moreover, it is within the scope of this invention to stop agitation during the period of time between successive additions.

Any suitable solid-liquid separation technique can be employed in step (f), such as filtration, centrifugation, settling and draining of the component and solution, preferably filtration.

Any suitable washing technique can be employed in step (f1), such as passing water or a dilute (e.g., 0.001–1 mol/l) aqueous solution (e.g., containing $NH_4OH$ as inorganic $NH_4$ salts) through the filter cake obtained in step (f), or slurrying the solids obtained in step (f) in water or in a dilute solution of $NH_4OH$ or inorganic $NH_4$ salts (such as $NH_4Cl$, $NH_4NO_3$, $(NH_4)_2SO_4$, $NH_4$ acetate and the like) and separating the dispersed solids, as has been described in step (f).

Any suitable temperature and heating time can be employed in step (g), generally about 200°–1900° F. and about 0.2–200 hours, respectively. Preferably, heating step (g) is carried out in two steps: (g1) at a temperature in the range of from about 200° to about 800° F., more preferably about 220° to about 400° F.; for a period of time in the range of from about 0.5 to about 5.0 hours, more preferably about 1.0 to about 3.0 hours, and (g2) at a temperature in the range of from about 900° to about 1900° F., more preferably about 950° to about 1,400° F., for a period of time in the range of from about 0.5 to about 5.0 hours, more preferably about 1.0 to about 4.0 hours. The pressure in steps (g1) and (g2) can be subatmospheric, atmospheric. (about 1 atm.) or superatmospheric, preferably atmospheric. The gas atmosphere in steps (g1) and (g2) can be inert (e.g., $N_2$), oxidizing (e.g., $O_2$-containing gas) or reducing, preferably oxidizing (more preferably air).

Any suitable impregnation technique can be employed in step (h), preferably by soaking the calcined material obtained in step (g) or (g2) with an impregnating solution comprising at least one transition compound (i.e., one or two or more of two compounds of one or two or more than two transition metals). Alternatively, the impregnating solution can be sprayed onto the calcined material. The concentration of a transition metal compound(s) in the impregnating solution can be chosen so as to provide the desired promoter level and can generally range from about 0.05 to about 2.0 mol/l. Any transition metal having hydrogenation activity can be used as promoters, such as Y, La, Ce, Ti, Zr, V, Mo, W, Mn, Re, Co, Ni, Cu and the like. Presently, preferred transition metal compounds are used in step (h) are those of Mo, Ni, Co and Cu. Optionally, a phosphorous compound can also be present such as $H_3PO_3$, $H_3PO_4$, ammonium phosphite, ammonium hydrogen phosphite, ammonium phosphate, diammonium hydrogen phosphate, ammonium dihydrogen phosphate and the like. Presently, more preferred promoter compounds are those disclosed in Example II. Other suitable transition metal compounds that disclosed in Example II. Other suitable transition metal compounds that can be used for impregnation are those disclosed in U.S. Pat. Nos. 4,588,706 and 4,585,751, herein incorporated by reference.

Any suitable heating condition can be employed in step (i) or, alternatively (preferably), steps (i1) and (i2). Generally, the heating conditions in step (i) are substantially the same as those described for step (g); and the heating conditions for alternative steps (i1) and (i2), respectively, are substantially the same as those described for steps (g1) and (g2), respectively.

The impregnated, calcined material obtained in step (i) or, alternatively, (i2) can be presulfided by step (K) of contacting said material obtained in step (i) or (i2) with at least one suitable sulfur compound, such as $H_2S$, COS, mercaptan(s), organic sulfide(s) and organic disulfide(s), either dissolved in a liquid solvent (such as gas oil or any other liquid petroleum distillate fraction) or mixed with a gas (such as $H_2S/H_2$ mixtures). The presulfiding step is carried out under such conditions (generally about 300°–800° F., for about 0.5–20 hours) as to convert at least a portion of the transition metal compounds contained in the composition of matter obtained in step (i) or (i2) to sulfides of said transition metals.

The composition of matter obtained in step (g) or, alternatively step (g2), generally contains from about 70 to about 99, preferably about 85 to about 97, weight-% alumina, and from about 30 to about 1.0, preferably about 15 to about 3, weight-% silica. The BET/$N_2$ surface area (ASTM D3037) of the composition of matter obtained in step (g) or, alternatively step (g2), generally is in the range of from about 150 to about 400 m²/g, preferably from about 180 to about 320 m²/g. The total pore volume of said composition of matter, determined by measuring porosimetry as described in Example I, generally is in the range of from about 0.8 to about 2.5 cc/g, preferably from about 1.0 to about 2.0 cc/g. Preferably, the pore volume of pores having a diameter of about 30–100 Angstroms is in the range of from about 0.1 to about 0.4 cc/g; the pore volume of pores having a diameter of about 100–200 Angstroms is in the range of from about 0.2 to about 0.7 cc/g (more preferably about 0.2–0.5 cc/g), and the pore volume of pores having a diameter of about 200–1000 Angstroms is in the range of from about 0.4 to about 1.4 cc/g (more preferably about 0.5–1.0 cc/g).

When the composition of matter of this invention has been impregnated with the transition metal compounds as promoters, the total content of these promoters is in the range from about 0.1 to about 25 weight-% transition metal, preferably from about 5 to about 15 weight- % metal (preferably Mo and/or Ni and/or Co and/or Cu). When a phosphorus compound is present, the weight percentage of P is in the range of from about 0.1 to about 5.0 weight-%. The weight percentage ranges of $Al_2O_3$ and $SiO_2$ in the promoted composition of matter are about the same as described above. The surface area and pore volume parameters of the thus-promoted composition of matter are also about the same as for the above-described unpromoted alumina-silica material. Subsequent presulfiding, as described above, generally does not result in any significant change in surface and pore parameters of the promoted composition of this invention.

The compositions of matter of this invention can be pelletized or compacted into various shapes (e.g., spherical, cylindrical or trilobal) for convenient shipping and use in fixed catalyst beds.

The compositions of matter of this invention, either unpromoted or, preferably promoted, with at least one transition metal compound (plus optionally at least one phosphorus compound) can be used for a variety of reactions, in partial or fractions employing hydrogen gas (i.e., hydrogenation and/or hydrotreating and/or hydrocracking). In a preferred embodiment, the catalyst composition of this invention is used as a catalyst for hydrotreating substantially liquid hydrocarbon-containing feed streams, which also contain compounds of sulfur and of metal(s) (nickel and/or vanadium) as impurities and, generally also asphaltenes, coke precursors (measured as Ramsbottom carbon residue, ASTM D524) and nitrogen compounds. Suitable hydrocarbon containing feed streams include crude oil and heavy fractions thereof, heavy oil extracts, liquid coal pyrolyzates, liquid from coal extraction, liquid products from tar sands, shale oil and heavy shale oil fractions. The catalyst compositions, preferably promoted, are particularly suited for treating heavy oil residual, which generally has an initial boiling point in excess of about 400° F., preferably in excess of about 600° F., containing about 5–1000 ppmw (parts by weight per million by weight of feed stream) of vanadium, about 3–500 ppmw of nickel, about 0.3–5.0 weight-% sulfur, about 0.2–2 weight-% nitrogen, and having an $API_{60}$ gravity of about 5–25.

The hydrotreating process of this invention employing the catalyst composition of this invention is carried out in any apparatus whereby an intimate contact of the catalyst composition with said hydrocarbon-containing feed stream and a free hydrogen-containing gas is achieved, under such conditions as to produce a hydrocarbon-containing product having a reduced level of metals (nickel and/or vanadium) and sulfur. Generally, a lower level of nitrogen and Ramsbottom carbon residue (ASTM D524) and a higher value of $API_{60}$ gravity are also attained in this hydrotreating process. The hydrotreating process can be carried out using a fixed catalyst bed (presently preferred) or a fluidized catalyst bed or a moving catalyst bed or an agitated slurry of the catalyst in the oil feed (hydrovisbreaking operation). The hydrotreating process can be carried out as a batch process or, preferably as a continuous process, more preferably in a tubular reactor containing one or more fixed catalyst beds, or in a plurality of fixed bed reactors in parallel or in series.

The catalyst composition of this invention can be used in said hydrotreating process alone in a reactor or may be used in combination with essentially unpromoted refractory materials such as alumina, silica, titania, magnesia, silicates, metal aluminates, alumino-silicates (e.g., zeolites), titania and metal phosphates. Alternating layers of the refractory material and of the catalyst composition can be used, or the catalyst composition can be mixed with the refractory material. Use of the refractory material with the catalyst composition provides for better dispersion of the hydrocarbon-containing feed stream. Also, other catalysts such as known hydrogenation and desulfurization catalysts (e.g., NiO/$MoO_3$, CoO/$MoO_3$ and NiO/CoO/$MoO_3$ on alumina) may be used with the catalyst composition of this invention to achieve simultaneous demetallization, desulfurization, denitrogenation, hydrogenation and hydrocracking, if desired. In one embodiment of said hydrocarbon hydrotreating process, the catalyst composition has been presulfided, as described above, before being used.

Any suitable reaction time between the catalyst composition, the hydrocarbon-containing feed stream and hydrogen gas can be utilized. In general, the reaction time will range from about 0.05 hours to about 10 hours. Preferably, the reaction time will range from about 0.4 to about 5 hours. Thus, the flow rate of the hydrocarbon-containing feed stream should be such that the time required for the passage of the mixture through the reactor (residence time) will preferably be in the range of about 0.4 to about 5 hours. In a continuous fixed bed operation, this generally requires a liquid hourly space velocity (LHSV) in the range of about 0.10 to about 20 cc of feed per cc of catalyst per hours, preferably from about 0.2 to about 2.5 cc/cc/hr.

The hydrotreating process employing the catalyst composition of the present invention can be carried out at any suitable temperature. The temperature will generally be in the range of about 250° C. to about 550° C. and will preferably be in the range of about 350° C. to about 450° C. Higher temperatures do improve the removal of metals, but temperatures which will have adverse effects on the hydrocarbon-containing feed stream, such as excessive coking, will usually be avoided. Also, economic considerations will usually be taken into account in selecting the operating temperature. Lower temperatures can generally be used for lighter feeds.

Any suitable pressure may be utilized in the hydrotreating process of this invention. The reaction pressure will generally be in the range of about atmospheric pressure (0 psig) to up to about 5,000 psig. Preferably, the pressure will be in the range of about 100 to about 2500 psig. Higher pressures tend to reduce coke formation but operating at high pressure may be undesirable for safety and economic reasons.

Any suitable quantity of hydrogen can be added to the hydrotreating process. The quantity of hydrogen used to contact the hydrocarbon-containing feed stock will generally be in the range of about 100 to about 10,000 standard cubic feet $H_2$ per barrel of the hydrocarbon-containing feed stream and will, more preferably, be in the range of about 1000 to about 6000 standard cubic feet $H_2$ per barrel of the hydrocarbon-containing feed stream.

In general, the catalyst composition is utilized primarily for demetallization until a satisfactory level of metals (Ni, V) removal is no longer achieved. Catalyst deactivation generally results from the coating of the catalyst composition with coke and metals removed from the feed. It is possible to remove the metals from the catalyst. But it is generally contemplated that once the removal of metals falls below a desired level, the spent (deactivated) catalyst will simply be replaced by fresh catalyst.

The time in which the catalyst composition of this invention will maintain its activity for removal of metals and sulfur will depend upon the metals concentration in the hydrocarbon-containing feed streams being treated. Generally, the catalyst composition can be used for a period of time long enough to accumulate about 20-200 weight-% of metals, mostly Ni and V, based on the initial weight weight of the catalyst composition from the hydrocarbon-containing feed. In other words, the weight of the spent catalyst composition will be about 20-200% higher than the weight of the fresh catalyst composition.

Generally, at least a portion of the hydrotreated product stream having reduced metal and sulfur contents is subsequently cracked in a cracking reactor, e.g., in a fluidized catalytic cracking unit, under such conditions as to produce lower boiling hydrocarbon materials (i.e., having a lower boiling range at 1 atm. than the feed hydrocarbons) suitable for use as gasoline, diesel fuel, lubricating oils and other useful products. It is within the scope of this invention to hydrotreat said product stream having reduced metal and sulfur contents in one or more processes using different catalyst compositions, such as alumina-supported $NiO/MoO_3$ or $CoO/MoO_3$ catalysts, for further removal of sulfur and other impurities, before the product stream is introduced into the cracking reactor.

A further embodiment of this invention is a hydrofining process comprising the step of introducing at least one thermally decomposable metal compound into the hydrocarbon-containing feed stream prior to its being contacted with the catalyst composition of this invention. The metal in the decomposable metal compound is selected from the group consisting of transition metals of Group IV-B, Group V-B, Group VI-B, Group VII-B, Group VIII and IB of the Periodic Table of Elements (as defined above). Preferred metals are molybdenum, tungsten, manganese, chromium, zirconium and copper. Molybdenum is a particularly preferred metal which may be introduced as a carbonyl, acetylacetonate, carboxylate having 1-12 C atoms per molecule (e.g., acetate, octoate, oxalate), naphthenate, mercaptide, dithiophosphate or dithiocarbamate. Molybdenum hexacarbonyl, molybdenum dithiophosphate and molybdenum dithiocarbamate are particularly preferred additives. The life of the catalyst composition and the efficiency of the demetallization process is improved by introducing at least one of the above-cited decomposable metal compounds into the hydrocarbon-containing feed, which also contains metals such as nickel and vanadium. These additives can be added continuously or intermittently and are preferably added at a time when the catalyst composition of this invention has been partially deactivated so as to extend its life.

Any suitable concentration of these additives may be added to the hydrocarbon-containing feed stream. In general, a sufficient quantity of the additive will be added to the hydrocarbon-containing feed stream to result in a concentration of the metal (preferably molybdenum) in said decomposable compounds ranging from about 1 to about 1000 parts per million and more preferably in the range of about 5 to about 100 parts per million in the feed stream.

The following examples are presented in further illustration of the invention and are not to be considered as unduly limiting the scope of this invention.

EXAMPLE I

This example illustrates the preparation of various alumina-containing materials.

Control Composition A was an alumina prepared by a pH swing method, substantially in accordance with the procedure described in "Preparation of Catalysts III", 1983, Elsevier Science Publishers, in the article of T. Ono, Y. Ohguchi and O. Togari entitled "Control of the Pore Structure of Porous Alumina". Two aqueous solutions were prepared. Solution A was a mixture containing 1590 grams of $Al(NO_3)_3.9H_2O$ and 2410 grams of distilled water (pH of solution A: 2.5). Solution B was an aqueous solution of sodium aluminate prepared by heating a mixture of 94.6 grams of NaOH and 166.2 grams of distilled water to about 190° F., adding 114.8 grams of $Al(OH)_3$ to this mixture over a period of 1 hour with stirring, heating the formed solution of sodium aluminate (Na:Al atomic ratio was 1.6:1) at 200° F. for about 2 hours, and adding enough distilled water so as to attain a total weight of Solution B of 375 grams (pH of solution B:10).

The two solutions (A and B) were poured into two separate Erlenmeyer flasks. Two conduits were installed connecting the two Erlenmeyer flasks via two small pumps with a 4-liter beaker, equipped with stirrer, pH meter and thermometer, and containing 1,000 grams distilled water. The beaker with contents was heated by means of a glycol bath having a temperature of 90° C. (194° F.).

During the first "swing" cycle, a portion of Solution A was pumped into the 4-liter beaker unitl the pH of the aqueous contents was 3.0. After 2 minutes, when the temperature of the aqueous contents of the beaker was 168° F., a sufficient amount of Solution B was pumped into the beaker over a period of about 1 minute so as to attain a pH of 8.8 of the aqueous contents in the beaker. After 5 minutes, the second swing cycle was commenced and solution was pumped into the beaker until a pH of 3.0 was attained. After 2 minutes, enough of Solution B was pumped into the beaker so as to change the pH back to 8.8. This cycle was repeated five more times. During the latter cycles, the time period during which Solution B was added was gradually raised from about 1 minute to about 3 minutes.

The formed aqueous suspension of alumina hydrogel was filtered and the filter cake was washed by slurrying in 2 liters of distilled water, stirring for about 30 minutes and filtering. The above washing procedure was repeated. The thus washed alumina was dried for 4 hours at about 120° C., calcined in air at 1300° F. for about 3 hours.

Invention Composition B was prepared by a process comprising the swing method described for Composition A. However, at the end of the fifth swing cycle, a solution of 7.2 grams of sodium orthosilicate ($Na_4SiO_4$) in 15 cc of water was added dropwise (during a period of about 2 minutes) to the beaker contents so as to raise the pH to 9.1. Thereafter, enough of Solution A was added to lower the pH to 7.5.

The swing cycles were carried out essentially as described for Composition A, with the exception that the pH after addition of Solution A was 3.3 (instead of 3.0), the temperature of the beaker content was about 160° F. (range: 152° to 166° F.) during the swing cycles, and the time period during which Solution B was added was about 2 minutes in cycle 1 and was gradually increased to about 5 minutes in cycle 5.

About 750 cc of distilled water was added to the aqueous dispersion (suspension) of silica-modified alumina hydrogel formed in the swing preparation described above. After about 15 minutes of aging, the above aqueous suspension dispersion of silica-modified alumina was filtered through a Buchner funnel. The filter cake was washed, dried and then calcined at 1300° F., as described for Composition A.

Invention Composition C was prepared essentially in accordance with the procedure for Composition B, with the exception that a solution of 28 grams of sodium silicate in 56 cc of H₂O was added after the fifth swing cycle.

Control Composition D was not prepared by a pH swing method. First, enough of Solution A was added to a 4-l beaker containing 1000 cc H₂O to attain a pH of 3.3. After 5 minutes, Solution A and Solution B were simultaneously pumped into the beaker for 1 hour at such rate as to maintain a constant pH of 7.3 of the aqueous contents in the beaker. The temperature of the aqueous contents in the beaker was maintained at about 175°–180° F. during the addition of Solutions A and B. At the end of the simultaneous addition of Solutions A and B, an additional aliquot of Solution B was added to the beaker so as to raise the pH to 8.8. The aqueous suspension of formed alumina hydrogel was recovered by filtration, washed, dried and calcined, substantially in accordance with the procedures described for Composition A.

Control Composition E was also prepared by simultaneous addition of Solutions A and B, essentially in accordance with the procedure described for Composition D, with the exception that at the end of the simultaneous addition operation a solution of 15 grams sodium orthosilicate (Na₄SiO₄) in 30 cc H₂O was added to the formed aqueous suspension of alumina hydrogel. After about 10 minutes of aging, the thus-formed silica-modified alumina hydrogel was recovered by filtration, washed, and dried, in accordance with the procedure described for Composition A.

Silica and sodium contents of Compositions A–E were determined by standard analytical techniques. The surface area of the calcined composition was determined by the BET/N₂ method (ASTM D3037); and the pore volume and pore size distribution were determined by mercury intrusion porosimetry (carried out at room temperature, at a mercury pressure ranging from 0 psi to 60,000 psi, using an Autopore 9200 instrument of Micromeritics, Norcross, Ga.). Pertinent test results are summarized in Table 1.

Data in Table I show that the silica-modified alumina Compositions B and C, made by the pH swing preparation method and final addition of the silicate, in accordance with this invention, exhibited a significant increase in surface area, total pore volume and the pore volume of large pores (200–1000 angstrom) versus alumina without SiO₂ (Composition A), also made by pH swing preparation.

This result was quite surprising because silica modification of alumina prepared by simultaneous addition of aluminum nitrate and sodium aluminate did not result in a significant increase in surface area and actually caused a decrease in total pore volume (compare Compositions D and E). The above-described increase in surface area, total pore volume and volume of large pores (200–1000 A) of Compositions B and C are expected to be beneficial in catalytic hydrotreating applications (hydrodesulfurization and -demetallization).

EXAMPLE II

This example illustrates the preparation and use of promoted hydrotreating catalysts using silica-modified alumina as catalyst base. This silica-modified alumina material was prepared substantially in accordance with the methods described for Invention Compositions B and C, except that the SiO₂ content was about 9 weight-%. Five batches of this calcined silica-modified alumina material were blended, extruded and then impregnated with an aqueous solution that had been prepared by mixing and heating under reflux conditions 134 grams of distilled water, 13.1 grams of 85 weight-% H₃PO₄, 60.4 grams of MoO₃ and 22.0 grams of NiCO₃. This impregnating solution contained 0.215 grams Mo per gram solution, 0.051 gram Ni per gram solution and 0.0167 gram P per gram solution. 473 grams of the SiO₂-modified alumina extrudate were mixed with 152.6 grams of the above-impregnated solution and 582 grams of water. The thus impregnated material was air-dried overnight, dried at 120° C. for about 3.5 hours, and then calcined in air for about 3 hours. This material labeled Invention Composition F, contained 7.0 weight-% Mo, 1.5 weight-% Ni and 0.5 weight-% P. The BET/N₂ surface area of Composition F was 212 m²/g and its pore volume (by mercury porosimetry was 1.0 cc/g).

A control catalyst composition was Composition G, a commercial hydrotreating catalyst, containing 7.5 weight-% Mo, 0.5 weight-% Ni and 0.9 weight-% Co (i.e., weight-% of Ni Co was 1.4 weight-%). The BET/N₂ surface area of Composition G was 174 m²/g, and its pore volume (measured by mercury intrusion porosimetry) was 0.62 cc/g.

TABLE I

| Composition | Wt % SiO₂ | Surface Area (m²/g) | Pore Volume (g/cc) | Pore Volume (cc/g) of Pores Having Diameter | | |
|---|---|---|---|---|---|---|
| | | | | 30–100A | 100–200A | 200–1000A |
| A (Control) | 0 | 183 | 1.16 | 0.15 | 0.88 | 0.13 |
| B (Invention) | 3.2 | 266 | 1.52 | 0.24 | 0.54 | 0.74 |
| C (Invention) | 8.7 | 308 | 1.78 | 0.31 | 0.39 | 1.03 |
| D (Control) | 0 | 215 | 1.08 | 0.36 | 0.37 | 0.00 |
| E (Control) | 1.9 | 224 | 0.65 | 0.48 | 0.09 | 0.08 |

Note:
Na content of all compositions was about 0.1 weight % or less.

EXAMPLE III

This example illustrates tests for investigating the hydrodesulfurization and -demetallization activities of the catalysts described in Example II. A heavy oil feed was pumped by means of a LAPP Model 211 (General Electric Company) pump to a metallic mixing T-pipe where it was mixed with a controlled amount of hydrogen gas. The oil/hydrogen mixture was pumped downward through a stainless steel trickle bed reactor, 28.5 inches long and 0.75 inches in diameter, fitted inside with a 0.25 inch O.D. axial thermocouple well. The reactor was filled with a top layer (3.5 inches below the oil/H₂ feed inlet) of 50 cc of low surface area (less than 2 m²/gram) α-alumina, a middle layer of 50 cc (20.5 g) of 50 cc catalyst mixed with 50 cc α-alumina are of the catalysts and a bottom layer of 50 cc of α-alumina. The reactor tube was heated by a Thermcraft (Winston-Salem, N.C.) Model 211 3-zone furnace. The reactor temperature was usually measured in four locations along the reactor bed by a traveling thermocouple that was moved within the axial thermocouple well.

The catalyst bed was presulfided before hydrofining tests by heating in a gas mixture of $H_2$ and $H_2S$ (having a volume ratio of $H_2:H_2S$ of about 9:1 and a total flow rate of 0.5 SCF per hour), at about 400° F. for about 30 hours and then at about 700° F. for about 30 hours. The liquid product was collected, filtered through a glass frit and analyzed. Exiting hydrogen gas was vented. Vandium, nickel and sulfur contents in oil were determined by plasma emission analysis.

The heavy oil feed was a blend of heavy crudes containing 14–20 ppmw Ni, 38–42 ppmw V and 1.7–1.8 weight-% S, and having $API_{60}$ gravity of about 16. Hydrofining tests were carried out at 720°–750° F., 2000 psig, about 0.5–1.0 LHSV (liquid hourly space velocity, i.e., cc oil feed per cc catalyst per hour), and 2,500 standard cubic feet of added $H_2$ per barrel of oil. Test results are summarized in Table II.

TABLE II

| Catalyst | Temp. (°F.) | Average LHSV | Average % Removal of S | Average % Removal of (Ni + V) |
|---|---|---|---|---|
| F (Invention) | 720 | 1.00 | 34.5 | 57.1 |
| G (Control) | 720 | 0.99 | 35.8 | 52.3 |
| F (Invention) | 720 | 0.51 | 39.3 | 68.1 |
| G (Control) | 720 | 0.51 | 38.9 | 68.3 |
| F (Invention) | 750 | 1.02 | 43.4 | 68.8 |
| G (Control) | 750 | 1.00 | 42.4 | 56.9 |
| F (Invention) | 750 | 0.51 | 47.1 | 79.2 |
| G (Control) | 750 | 0.51 | 47.1 | 77.3 |

Data in Table II show that the invention catalyst (Composition F) exhibited, at comparable temperature/LHSV conditions, either higher desulfurization activity or higher demetallization activity or both than the commercial hydrotreating catalyst (Composition G). The advantage of F versus G, in terms of removal of sulfur as well as nickel and vanadium, was especially pronounced at the higher temperature and higher flow rate (750° F.; LHSV:1.0), which are the more desirable conditions in commercial hydrocarbons operations.

Based on the surface area and pore volume results summarized in Table I, it is concluded that invention catalyst Composition F would also be more effective in removing nickel, vanadium, and sulfur from heavy oils by hydrotreatment than a catalyst prepared by impregnation of control Composition E (silica-modified alumina not prepared by the pH swing method) with 7.0 weight % Mo, 1.5 weight % Ni and 0.5 weight % P.

Reasonable variations and modifications can be made in this invention without departing from the spirit and scope thereof.

That which is claimed is:

1. A process for preparing a composition of matter comprising alumina as the major component and silica as a minor component, said process comprising the steps of
    (a) mixing a portion of a first solution comprising water and at least one dissolved aluminum salt with a suitable portion of a second solution comprising water and at least one dissolved alkali metal aluminate under such conditions as to obtain a dispersion of precipitated alumina hydrogel in an aqueous solution having a pH of about 8 to about 10;
    (b) adding a suitable amount of said first solution to said dispersion of precipitated alumina hydrogel in an aqueous solution having a pH of about 8 to about 10 obtained in step (a), so as to obtain a dispersion of precipitated alumina hydrogel in an aqueous solution having a pH of about 2 to about 4;
    (c) adding a suitable amount of said second solution to said dispersion of precipitated alumina hydrogel in the aqueous solution having a pH of about 2 to about 4 obtained in step (b), so as to obtain a dispersion of precipitated alumina hydrogel in an aqueous solution having a pH of about 8 to about 10;
    (d) repeating steps (b) and (c) at least once;
    (e) adding a third solution comprising water and at least one dissolved alkali metal silicate to the dispersion of precipitated alumina hydrogel in an aqueous solution having a pH of about 8 to about 10 obtained at the end of step (d), under such conditions and at such proportion as to obtain a dispersion of alumina-silica hydrogel in an aqueous solution;
    (f) separating said alumina-silica hydrogel from the aqueous solution in which said hydrogel is dispersed;
    (g) heating the separated alumina-silica hydrogel obtained in step (f) under such conditions as to substantially dehydrate said hydrogel and to obtain a composition of matter comprising alumina as the major component and silica as a minor component.

2. A process in accordance with claim 1 wherein said at least one dissolved aluminum salt is aluminum nitrate, said at least one dissolved alkali metal aluminate is sodium aluminate, and said at least one dissolved alkali metal silicate is sodium orthosilicate.

3. A process in accordance with claim 1 wherein the concentration of said at least one dissolved aluminum salt in said first solution is in the range of from about 0.5 to about 3.5 mol/l, the concentration of said at least one dissolved alkali metal aluminate in said second solution is in the range of from about 3.0 to about 8.0 mol/l, and the concentration of said at least one dissolved alkali metal silicate in said solution is in the range of from about 0.5 to about 7.0 mol/l.

4. A process in accordance with claim 3 wherein said concentration in said first solution is in the range of from about 1.0 to about 2.5 mol/l, said concentration in said second solution is in the range of from about 5.5 to about 7.5 mol/l, and said concentration in said third solution is in the range of from about 1.7 to about 3.5 mol/l.

5. A process in accordance with claim 1 wherein the temperature in steps (a), (b), (c), (d) and (e) is in the range of from about 30° C. to about 95° C.; and the time lag between steps (a) and (b), steps (b) and (c), steps (c) and (d) and steps (d) and (e) is in the range of from about 1 to about 15 minutes.

6. A process in accordance with claim 1 wherein said step (d) is repeated from about 2 to 10 times.

7. A process in accordance with claim 1 comprising the additional step of
(e1) adding a sufficient amount of said first solution to said dispersion of alumina-silica hydrogel in an aqueous solution obtained in step (e) so as to attain a pH of about 7-8.

8. A process in accordance with claim 1 comprising the additional step of
(f1) washing the separated alumina-silica hydrogel obtained in step (f) with a liquid selected from the group consisting of water, aqueous solutions of ammonia and aqueous solutions of ammonium salts.

9. A process in accordance with claim 1 wherein step (g) is carried out in two sub-steps:
(g1) heating said separated alumina-silica hydrogel obtained in step (f) at a first temperature so as to substantially dry said separated alumina-silica hydrogel, and
(g2) heating the substantially dried material obtained in step (g1) at a second temperature, which is higher than said first temperature, so as to obtain said composition of matter in substantially dehydrated form.

10. A process in accordance with claim 9 wherein said first temperature in step (g1) is in the range of from about 200° to about 800° F. and said second temperature in step (g2) is in the range of from about 900° to about 1900° F.

11. A process in accordance with claim 1 wherein said composition of matter obtained in step (g) comprises from about 70 to about 99 weight-% alumina, from about 30 to about 1 weight-% silica, having a surface area in the range of from about 150 to about 400 m$^2$/g, and having a total pore volume in the range of from about 0.8 to about 2.5 cc/g.

12. A process in accordance with claim 1 further comprising the additional steps of
(h) impregnating the composition comprising alumina and silica obtained in step (g) with a solution containing at least one compound of at least one transition metal selected from metals belonging to Groups IIIB, IVB, VB, VIB, VIIB, VIII and IB of the Periodic Table, and
(i) heating the impregnated material obtained in step (h) under such conditions as to substantially dry said impregnated material and to at least partially convert said at least one compound of at least one transition metal contained in said impregnated material to at least one transition metal oxide.

13. A process in accordance with claim 12, wherein said at least one transition metal is selected from the group consisting of Y, La, Ce, Ti, Zr, V, Mo, W, Mn, Re, Co, Ni, and Cu.

14. A process in accordance with claim 12, wherein said heating step (i) is carried out in two sub-steps:
(i1) heating the impregnated material obtained in step (h) at a first temperature under such conditions as to substantially dry said impregnated material, and
(i2) heating the substantially dried material obtained in step (i1) at a second temperature, which is higher than said first temperature, under such conditions as to convert at least a portion of said at least one compound of at least one transition metal contained in said substantially dried material.

15. A process in accordance with claim 14, wherein said first temperature is in the range of from about 200° to about 800° F. and said second temperature is in the range of from about 900° to about 1900° F.

16. A process in accordance with claim 12, wherein the material obtained in step (i) comprises from about 0.1 to about 25 weight-% transition metal.

17. A process in accordance wih claim 16, wherein the material obtained in step (i) further comprises from about 0.1 to about 5.0 phosphorus.

18. A process in accordance with claim 12 comprising the additional step of
(k) contacting the material obtained in step (i) with at least one sulfur compound selected from the group consisting of $H_2S$, COS, mercaptans, organic sulfides and organic disulfides under such conditions as to convert at least a portion of transition metal compounds to transition metal sulfides.

19. A composition of matter comprising alumina as the major component and silica as a minor component, having been prepared by a process comprising the steps of
(a) mixing a portion of a first solution comprising water and at least one dissolved aluminum salt with a suitable portion of a second solution comprising water and at least one dissolved alkali metal aluminate under such conditions as to obtain a dispersion of precipitated alumina hydrogel in an aqueous solution having a pH of about 8 to about 10;
(b) adding a suitable amount of said first solution to said dispersion of precipitated alumina hydrogel in an aqueous solution having a pH of about 8 to about 10 obtained in step (a), so as to obtain a dispersion of precipitated alumina hydrogel in an aqueous solution having a pH of about 2 to about 4;
(c) adding a suitable amount of said second solution to said dispersion of precipitated alumina hydrogel in the aqueous solution having a pH of about 2 to about 4 obtained in step (b), so as to obtain a dispersion of precipitated alumina hydrogel in an aqueous solution having a pH of about 8 to about 10;
(d) repeating steps (b) and (c) at least once;
(e) adding a third solution comprising water and at least one dissolved alkali metal silicate to the dispersion of precipitated alumina hydrogel in an aqueous solution having a pH of about 8 to about 10 obtained at the end of step (d), under such conditions and at such proportion as to obtain a dispersion of alumina-silica hydrogel in an aqueous solution;
(f) separating said alumina-silica hydrogel from the aqueous solution in which said hydrogel is dispersed;
(g) heating the separated alumina-silica hydrogel obtained in step (f) under such conditions as to substantially dehydrate said hydrogel and to obtain a composition of matter comprising alumina as the major component and silica as a minor component.

20. A composition of matter in accordance with claim 19, wherein said at least one dissolved aluminum salt is aluminum nitrate, said at least one dissolved alkali metal aluminate is sodium aluminate, and said at least one dissolved alkali metal silicate is sodium orthosilicate.

21. A composition of matter in accordance with claim 19, wherein the concentration of said at least one dissolved aluminum salt in said first solution is in the range of from about 0.5 to about 3.5 mol/l, the concentration of said at least one dissolved alkali metal aluminate in said second solution is in the range of from about 3.0 to about 8.0 mol/l, and the concentration of said at least one dissolved alkali metal silicate in said third solution is in the range of from about 0.5 to about 7.0 mol/l.

22. A composition of matter in accordance with claim 21, wherein said concentration in said first solution is in the range of from about 1.0 to about 2.5 mol/l, said concentration in said second solution is in the range of from about 5.5 to about 7.5 mol/l, and said concentration in said third soution is in the range of from about 1.7 to about 3.5 mol/l.

23. A composition of matter in accordance with claim 19, wherein the temperature in steps (a), (b), (c), (d) and (e) is in the range of from about 30° C. to about 95° C.; and the time lag between steps (a) and (b), steps (b) and (c), steps (c) and (d) and steps (d) and (e) is in the range of from about 1 to about 15 minutes.

24. A composition of matter in accordance with claim 19, wherein said step (d) is repeated from about 2 to 10 times.

25. A composition of matter in accordance with claim 19, wherein said process comprises the additional step of
(e1) adding a sufficient amount of said first solution to said dispersion of alumina-silica hydrogel in an aqueous solution obtained in step (e) so as to attain a pH of about 7-8.

26. A composition of matter in accordance with claim 19, wherein said process comprises the additional step of
(f1) washing the separated alumina-silica hydrogel obtained in step (f) with a liquid selected from the group consisting of water, aqueous solutions of ammonia and aqueous solutions of ammonium salts.

27. A composition of matter in accordance with claim 19, wherein step (g) is carried out in two sub-steps
(g1) heating said separated alumina-silica hydrogel obtained in step (f) at a first temperature so as to substantially dry said separated alumina-silica hydrogel, and
(g2) heating the substantially dried material obtained in step (g1) at a second temperature, which is higher than said first temperature, so as to obtain said composition of matter in substantially dehydrated form.

28. A composition of matter in accordance with claim 27, wherein said first temperature in step (g1) is in the range of from about 200° to about 800° F. and said second temperature in step (g2) is in the range of from about 900° to about 1900° F.

29. A composition of matter in accordance with claim 19, comprising from about 70 to about 99 weight-% alumina, from about 30 to about 1 weight-% silica, having a surface area in the range of from about 150 to about 400 m²/g, and having a total pore volume in the range of from about 0.8 to about 2.5 cc/g.

30. A composition of matter in accordance with claim 19, comprising from about 85 to about 97 weight-% alumina, from about 15 to about 3 weight-% silica, having a surface area in the range of from about 180 to about 320 m²/g, and having a total pore volume in the range of from about 1.0 to about 2.0 cc/g.

31. A composition of matter in accordance with claim 19, wherein the pore volume of pores having a diameter of about 30-100 Angstroms is in the range of from about 0.1 to about 0.4 cc/g, the pore volume of pores having a diameter of about 100-200 Angstroms is in the range of from about 0.2 to about 0.7 cc/g, and the pore volume of pores having a diameter of about 200-1000 Angstroms is in the range of from about 0.4 to about 1.4 cc/g.

32. A composition of matter in accordance with claim 19, wherein said process further comprises the additional steps of
(h) impregnating the composition comprising alumina and silica obtained in step (g) with a solution containing at least one compound of at least one transition metal selected from metals belonging to Groups IIIB, IVB, VB, VIB, VIIB, VIII and IB of the Periodic Table, and
(i) heating the impregnated material obtained in step (h) under such conditions as to substantially dry said impregnated material and to at least partially convert said at least one compound of at least one transition metal contained in said impregnated material to at least one transition metal oxide.

33. A composition of matter in accordance with claim 32, wherein said at least one transition metal is selected from the group consisting of Y, La, Ce, Ti, Zr, V, Mo, W, Mn, Re, Co, Ni, and Cu.

34. A composition of matter in accordance with claim 32, wherein said heating step (i) is carried out in two sub-steps:
(i1) heating the impregnated material obtained in step (h) at a first temperature under such conditions as to substantially dry said impregnated material, and
(i2) heating the substantially dried material obtained in step (i1) at a second temperature, which is higher than said first temperature, under such conditions as to convert at least a portion of said at least one compound of at least one transition metal contained in said substantially dried material.

35. A composition of matter in accordance with claim 34, wherein said first temperature is in the range of from about 200° to about 800° F. and said second temperature is in the range of from about 900° to about 1900° F.

36. A composition of matter in accordance with claim 32, wherein the material obtained in step (i) comprises from about 0.1 to about 25 weight-% transition metal.

37. A composition of matter in accordance with claim 36, wherein said transition metal is selected from the group consisting of Mo, Ni, Co and Cu.

38. A composition of matter in accordance with claim 36 wherein the material obtained in step (i) further comprises from about 0.1 to about 5.0 phosphorus.

39. A composition of matter in accordance with claim 32, wherein said process comprises the additional step of
(k) contacting the material obtained in step (i) with at least one sulfur compound selected from the group consisting of $H_2S$, COS, mercaptans, organic sulfides and organic disulfides under such conditions as to convert at least a portion of transition metal compounds to transition metal sulfides.

* * * * *